United States Patent Office 3,511,853
Patented May 12, 1970

3,511,853
4,5-BENZO-3H-1,2-THIASELENOL-5-ONE AND PRODUCTION THEREOF
Erwin Klingsberg, Geneva, Switzerland, assignor to American Cyanamid Company, Stamford, Conn., a corporation of Maine
No Drawing. Filed Nov. 28, 1967, Ser. No. 686,332
Int. Cl. A01n 9/12; C05f 11/00; C07d 90/00
U.S. Cl. 260—327     2 Claims

ABSTRACT OF THE DISCLOSURE

A new sulfur-selenium compound having the formula:

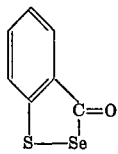

is prepared by reacting o,o'-dithiodibenzoic acid with $P_2Se_5$. It is a potent fungicide at 1 p.p.m. and shows herbicidal and insecticidal activity at higher concentrations.

---

This invention relates to 4,5-benzo-3H-1,2-thiaselenol-3-one, which is a new chemical compound. The invention includes the compound itself, its method of preparation, and biocidal and especially fungicidal compositions containing it.

I have found that this compound, which has the formula

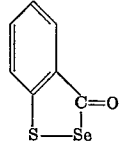

can be synthesized by reacting o,o'-dithiobenzoic acid (I) with phosphorous selenide, $P_2Se_5$. The reaction is conveniently carried out by dissolving the reactants in pyridine and heating at reflux. Disulfide reduction followed by ring closure give the product, the reaction being formulated as follows:

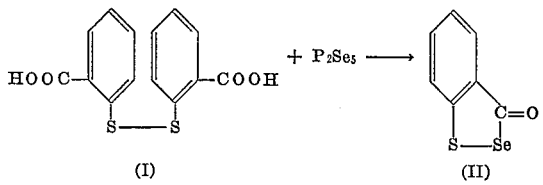

Compound II is novel; its ring system is unknown. The closest art of which I am aware is the compound 4,5-benzo-3H-2,1-thiaselenol-3-one (The Ring Index, System No. 1249) that was described in Ber. 1077–82 (1924) by Lesser and Weiss. This compound, which was prepared by reacting sodium sulfide with o-ClSeC$_6$H$_4$COCl in acetone, has a different ring system wherein the selenium atom is attached directly to an aromatic ring carbon.

4,5-benzo-3H-1,2-thiaselenol-3-one (Compound II) is a potent fungicide, herbicide, nematocide, and insecticide. When used as a fungicide, or as an insecticide against spider mites, bean bettles, houseflies and the like, it is preferably mixed with a non-phytotoxic solid carrier, such as calcined clays, talc, wood flour, silica, chalk and the like at concentrations of about 0.01% to 5% for use as a dusting powder, or with a liquid such as water, benene, or volatile aliphatic hydrocarbon fractions in about the same concentrations for use as a spray. Suitable wetting and dispersing agents such as sodium lauryl sulfate, sodium dodecylbenzenesulfonate or sodium dioctyl sulfosuccinate, may be present in these compositions as well as sticking agents such as methylcellulose.

The new compound, its method of preparation, and its uses for the above purposes are further described in the following examples.

EXAMPLE 1

A mixture of 3 grams o,o'-dithiodibenzoic acid (I) and 9 grams finely ground phosphorus pentaselenide ($P_2Se_5$) was stirred into 75 ml. pyridine, heated under reflux for 25 minutes, clarified, cooled and diluted with hydrochloric acid. The product that precipitated was filtered, dried, dissolved in carbon disulfide, filtered, and recovered by evaporating the solvent. After crystallization from hexane it melted at 82° C.–84° C.

*Analysis.*—Calcd. for C$_7$H$_4$OSSe (percent): C, 39.0; H, 1.9; S, 14.9; Se, 36.7. Found (percent): C, 39.3; H, 1.9; S, 15.3; Se, 35.7.

EXAMPLE 2

The product of Example 1 was tested for antifungal activity by agar dilution streak plate assay. It was incorporated in the agar at the concentration in micrograms per milliliter (equivalent to parts per million) given below and the test organism streaked across it. Incubation was at 28° C. for two days for the first three organisms listed and for four days for the rest. The values in the table represent minimal concentrations for complete inhibition of growth of the organism.

| Fungus: | Concentration in mcg./ml. |
|---|---|
| *Candida albicans* | 0.15 |
| *Candida mycoderma* | 1.5 |
| *Saccharomyces cerevisiae* | 3.1 |
| *Mucor ramannianus* | 0.62 |
| *Fusarium episphaeria* | 0.15 |
| *Hormodendrum cladosporoides* | 0.15 |
| *Trichophyton mentagrophytes* | 0.15 |
| *Microsoporum gypseum* | 0.15 |
| *Penicillium digitatum* | 3.1 |
| *Memnoniella echinata* | 0.62 |
| *Chaetomium globosum* | 3.1 |
| *Aspergillus fumigatus* | 0.06 |

In additional tests conidia of *Monolinia fructicola Stemphylium sarcinaeforme* and *Aspergillus niger* were placed in separate 4-dram vials in aqueous suspensions and Compound II was added in concentrations of 100, 10 and 1 part per million. The suspensions were then shaken continuously at room temperature for 24 hours. Inhibition of spore germination was 100% for all three fungi at all three concentrations.

Tests made on eelworms at 100 p.p.m. showed that Compound II is also a nematocide.

EXAMPLE 3

Compound II was placed in 1.5% water agar at concentrations of 500, 100 and 10 p.p.m. and 20 ml. of each concentration was dispensed into a series of wide-mouth 2-ounce bottles. Tests seeds were placed on the agar surfaces following germination and 2 ml. of water was added to each jar to facilitate gelling. Final data on germination and growth, recorded after three weeks, were as follows.

| Seed | Concentration, p.p.m. | | | |
|---|---|---|---|---|
| | 500 | 100 | 10 | 0 |
| Wheat | Kill | Kill | No effect | No effect. |
| Sweet corn | do | do | Kill | Do. |
| Radish | do | do | No effect | Do. |
| Cucumber | do | do | do | Do. |

These tests show that the compound is a herbicide.

In a preemergence herbicide test, when applied to soil at the rate of twenty-five pounds per acre, there was a stand reduction of 100% for mustard and millet, 50% for wheat and 70% for radish. The compound of The Ring Index, System No. 1249, in the same test showed no stand reduction at all (0% control).

EXAMPLE 4

Lima bean plants infested with two-spoted spider mite and eggs were dipped for three seconds into an emulsion of 65% acetone-35% water containing 100 p.p.m. of Compound II and were then held at 80° F. and 60% relative humidity for two days. A 100% kill was achieved.

An 0.4% emulsion of the compound killed 56% of mosquito larvae in twenty-four hours.

The compound also functions as a systemic insecticide. When a 100 p.p.m. emulsion is absorbed through the stems of lima bean plants and the leaves are eaten by adult two-spotted spider mites the kill is 75% in three days.

What is claimed is:
1. 4,5-benzo-3H-1,2-thiaselenol-3-one.
2. A method of preparing the compound of claim 1 which comprises reacting o,o'-dithiodibenzoic acid with phosphorus pentaselenide.

References Cited

Fava et al., U.S. Atomic Energy Comm., UCRL–3568, 9 pp. (1956).

HENRY R. JILES, Primary Examiner

C. M. SHURKO, Assistant Examiner

U.S. Cl. X.R.

71—3; 424—275

PO-1050
(5/69)

UNITED STATES PATENT OFFICE
CERTIFICATE OF CORRECTION

Patent No. 3,511,853      Dated May 12, 1970

Inventor(s) ERWIN KLINGSBERG

It is certified that error appears in the above-identified patent and that said Letters Patent are hereby corrected as shown below:

Column 1, lines 2 and 3, cancel

"4,5-BENZO-3H-1,2-THIASELENOL-5-ONE AND PRODUCTION THEREOF"

and substitute --

4,5-BENZO-3H-1,2-THIASELENOL-3-ONE AND PRODUCTION THEREOF --.

Column 1, line 44, cancel "give" and substitute -- gives --.

Column 1, line 69, cancel "benene" and substitute -- benzene --.

Column 2, line 45, insert a comma -- , -- after "Monolinia fructicola".

SIGNED AND
SEALED
OCT 27 1970

(SEAL)
Attest:

Edward M. Fletcher, Jr.
Attesting Officer

WILLIAM E. SCHUYLER, JR.
Commissioner of Patents